(12) United States Patent
Harasemchuk et al.

(10) Patent No.: US 8,887,038 B2
(45) Date of Patent: Nov. 11, 2014

(54) EXTRAPOLATING TABULAR STRUCTURE IN A FREEFORM DOCUMENT

(75) Inventors: Christopher Harasemchuk, Surrey (CA); Mark Siegel, Vancouver (CA); Ken Wong, Burnaby (CA); Madison Poon, Vancouver (CA); Yahui Lu, Richmond (CA)

(73) Assignee: Business Objects Software Limited, Dublin (IE)

( * ) Notice: Subject to any disclaimer, the term of this patent is extended or adjusted under 35 U.S.C. 154(b) by 159 days.

(21) Appl. No.: 12/900,499

(22) Filed: Oct. 8, 2010

(65) Prior Publication Data
US 2012/0089896 A1 Apr. 12, 2012

(51) Int. Cl.
*G06F 17/00* (2006.01)
*G06K 9/00* (2006.01)

(52) U.S. Cl.
CPC ........ *G06K 9/00449* (2013.01); *G06K 9/00469* (2013.01)
USPC ........... 715/227; 715/228; 715/243; 715/246; 715/247

(58) Field of Classification Search
USPC .......................... 715/206, 222, 226, 227, 228
See application file for complete search history.

(56) References Cited

U.S. PATENT DOCUMENTS

| | | | |
|---|---|---|---|
| 5,392,130 A | | 2/1995 | Mahoney |
| 5,841,900 A | * | 11/1998 | Rahgozar et al. ............. 715/209 |
| 6,006,240 A | | 12/1999 | Handley |
| 6,525,749 B1 | * | 2/2003 | Moran et al. .................. 715/863 |
| 6,603,493 B1 | * | 8/2003 | Lovell et al. .................. 715/800 |
| 2005/0210372 A1 | * | 9/2005 | Kraft et al. .................... 715/509 |
| 2010/0122192 A1 | | 5/2010 | Hanna |
| 2010/0211871 A1 | * | 8/2010 | Kubota et al. ................. 715/247 |
| 2011/0219321 A1 | * | 9/2011 | Gonzalez Veron et al. ... 715/764 |
| 2011/0271177 A1 | * | 11/2011 | Bastos Dos Santos et al. ............................ 715/256 |

FOREIGN PATENT DOCUMENTS

EP    0779593 A2    6/1997

OTHER PUBLICATIONS

European Search Report for EP Application No. 11007405.1-1224, mailed Apr. 5, 2012, 5 pages; EPO, Rijswijk, Netherlands.
Bier, Eric A., 1998 "Snap-Dragging: Interactive Geometric Design in Two and Three Dimensions" Technical Report No. UCB/CSD-88-416; EECS Department, University of California at Berkeley Berkeley, CA, USA, pp. i-vi, 1-164. URL: http://www.eecs.berkeley.edu/Pubs/TechRpts/1988/CSD-88-416.pdf.

(Continued)

*Primary Examiner* — Adam M Queler
*Assistant Examiner* — Ariel Mercado

(57) ABSTRACT

Various embodiments of systems and methods for extrapolating tabular structure to facilitate manipulation of elements in the freeform document are described herein. The freeform document includes an unstructured canvas providing users the ability to place one or more elements in the canvas. A primary column is determined by the selection of at least one element in the freeform document. Further, one or more secondary columns in the freeform document corresponding to the primary column are determined. A tabular structure in the freeform document is extrapolated based on the determined primary column and the one or more secondary columns to facilitate manipulation of elements in the freeform document, such as reordering, resizing and deleting the one or more elements, and inserting one or more new elements in the freeform document.

17 Claims, 13 Drawing Sheets

(56) References Cited

OTHER PUBLICATIONS

Beaudouin-Lafon, M. and W.E. Mackay, 2000 "Reification, polymorphism and reuse: three principles for designing visual interfaces" Proceedings of the working conference on Advanced Visual Interfaces (AVI 2000), held in Palermo, Italy, Published by ACM New York, NY, USA, 2000, pp. 102-109. URL: http://dl.acm.org/citation.cfm? id=345513.345267.

Beaudouin-Lafon, Michel, Wendy E. Mackay, Mads Jensen, Peter Andersen, Paul Janecek, Henry Michael Lassen, Kasper Lund, Kjeld Høyer Mortensen, Stephanie Munck, Anne V. Ratzer, Katrine Ravn, Søren Christensen, and Kurt Jensen, 2001 "CPN/Tools: A Tool for Editing and Simulating Coloured Petri Nets ETAPS Tool Demonstration Related to TACAS" Proceedings of the 7th International Conference on Tools and Algorithms for the Construction and Analysis of Systems (TACAS 2001), Springer-Verlag London, UK, pp. 574-577.

Lee, J.J., 1990 "Xsketch: a multi-user sketching tool for X11" Proceedings of the ACM SIGOIS and IEEE CS TC-OA conference on Office Information Systems (COCS 1990), ACM New York, NY, USA, pp. 169-173. URL: http://dl.acm.org/citation.cfm?id=91510.

* cited by examiner

EXTRAPOLATING TABULAR STRUCTURE IN A FREEFORM DOCUMENT

FIELD

Embodiments generally relate to computer systems, and more particularly to methods and systems for extrapolating tabular structure in a freeform document to facilitate manipulation of elements in the freeform document.

BACKGROUND

One of the primary factors considered in the design and development of software applications is ease of use. Often the difference between a successful software application and an unsuccessful software application is decided by the user's experience when interacting with the software. One such competitive segment of software applications is Business Intelligence (BI) applications, such as, Crystal Reports® by SAP®. A report is a document that includes information automatically retrieved (i.e., in response to computer executable instructions) from a data source (e.g., a database, a data warehouse, and the like), where the information is processed, structured, and formatted in accordance with a report schema. The schema is the template of the report, defines a base query, and specifies the form in which the information should be presented. In creating and updating reports, users are given the ability to include content or elements or objects on a freeform canvas/document. Such freeform documents enhance the understanding of the business model by providing professional reports suited to individual and/or business needs.

Freeform canvas or document does not force users to layout the elements in a predefined way. Therefore, the freeform documents facilitate users to layout the elements as per their desire for spotting and analyzing business data. In general, the freeform document facilitates providing historical, current, and predictive views of business operations in a user friendly way. However, the freeform documents have one or more following limitations during modification or manipulation of the elements in the freeform documents.

Currently, the freeform documents lack structural associations among elements as they do not force the user to layout the elements in the predefined way, which makes creation and modification of tabular layouts tedious. Conversely, enforcing a structure such as a table or a grid does not allow flexibility in layout of a strict structure. Therefore, a method to provide structured interactions without enforcing structure in the freeform document, i.e., to extrapolate tabular structure in a freeform document, would be desirable to facilitate easy manipulation of elements in the freeform document.

SUMMARY

Various embodiments of systems and methods for extrapolating tabular structure to facilitate manipulation of elements in the freeform document are described herein. The freeform document includes an unstructured canvas providing users the ability to place one or more elements on the canvas. A primary column is determined by the selection of at least one element in the freeform document. Further, one or more secondary columns in the freeform document corresponding to the primary column are determined. A tabular structure in the freeform document is extrapolated based on the determined primary column and the one or more secondary columns to facilitate manipulation of elements in the freeform document, such as reordering, resizing and deleting the one or more elements, and inserting one or more new elements in the freeform document.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Figure 1:
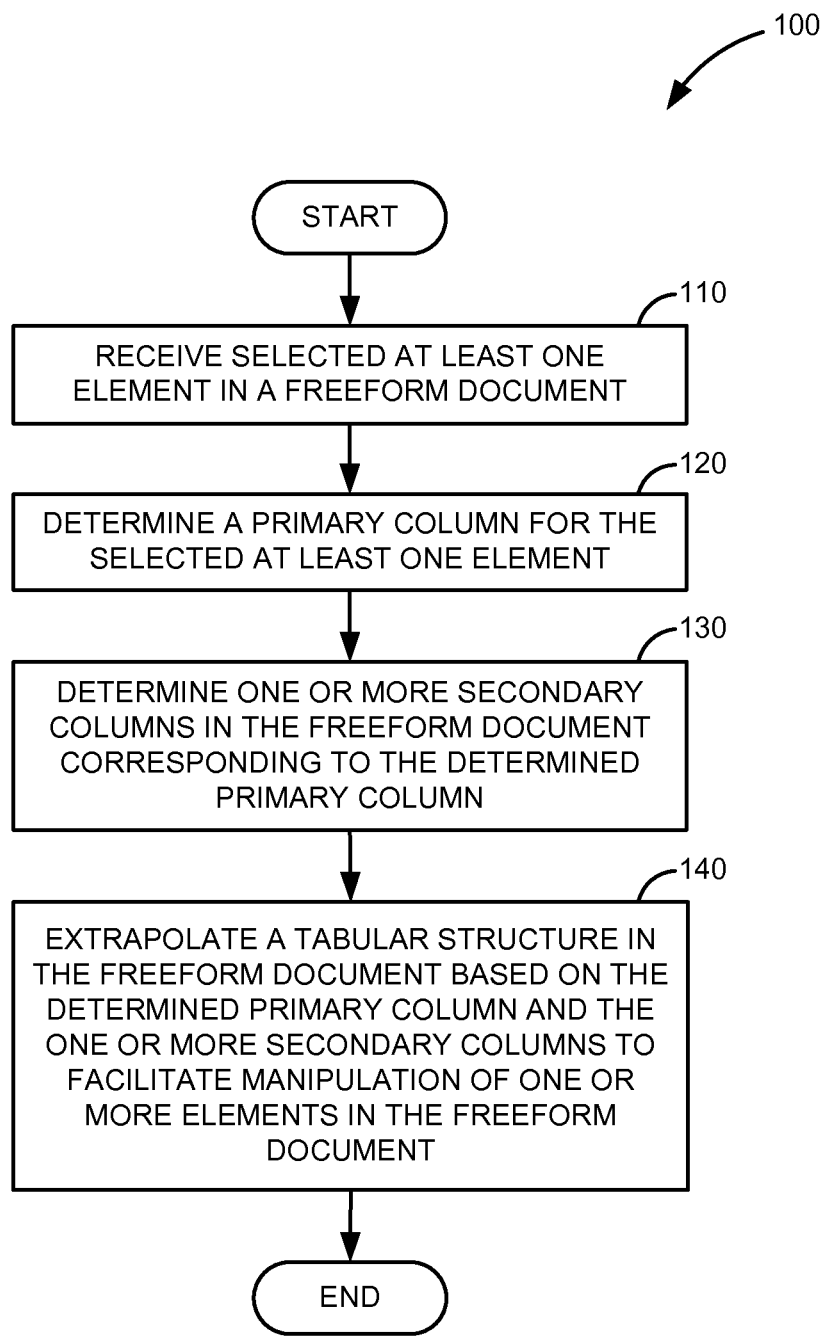
FIG. 1 is a flow diagram illustrating a process for extrapolating a tabular structure in a freeform document, according to an embodiment.

Embodiments of techniques for extrapolating a tabular structure in a freeform document to facilitate manipulation of elements in the freeform document are described herein. Freeform document includes a canvas such as PowerPoint® document by Microsoft®, an Illustrator® document by Adobe®, an AutoCAD® document and the like, which provides a user with the ability to place contents or elements or objects on the canvas such that the elements can occupy any position within the canvas as desired by the user. The user refers to an agent, a human, a computer, other mechanism or actors capable of creating and manipulating the freeform document. In other words, the freeform document includes the canvas which does not force the elements to layout in a predefined way like a Microsoft® Access® document or define a finite set of locations to place the elements like a Microsoft® Excel® document. Example of freeform documents includes, a Business Intelligence (BI) documents such as reports and dashboards. Examples of report include the documents created in a Crystal Reports® and SAP® Business Objects™ Web Intelligence®. Examples of dashboards are created by Xcelsius®, SAP® Crystal Dashboard Design™, and SAP® Crystal Presentation Design™. The degree to which a freeform canvas is freeform varies with embodiments of the invention. In some embodiments, the canvas can be segmented into sections, e.g., horizontal bands in the report, a tab in the dashboard and the like. In some embodiments, the sections are placed freeform. In some embodiments, the formatting within the section, the layout is freeform.

The tabular structure in the freeform document is extrapolated to manipulate the elements in the freeform document such as to reorder the elements, resize the elements, delete the elements, insert new elements, and the like. In one embodiment, the tabular structure is extrapolated based on an element selected by the user in the freeform document. A primary column is determined for the selected element in a freeform document. Further, one or more secondary columns in the freeform document corresponding to the primary column are determined. Further, the tabular structure in the freeform document is extrapolated based on the determined primary column and the one or more secondary columns to facilitate manipulation of elements in the freeform document. In addition, one or more spanning elements which span a plurality of columns including the primary column and the secondary columns in the freeform document are identified to extrapolate the tabular structure in the freeform document.

In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments. As well, while certain methods described with separately delineated steps these should not be construed as necessarily order dependent or being separate in their performance.

FIG. 1 is a flow diagram illustrating a process for extrapolating a tabular structure in a freeform document, according to an embodiment. At step 110, selection of at least one element in a freeform document is received. In one exemplary embodiment, the element is selected by a user. Freeform document includes an unstructured canvas providing ability to place one or more elements on the canvas and does not force the elements to layout in a predefined way such as through a grid and the like. At step 120, a primary column for the at least one element is determined. In one embodiment, the primary column is determined by identifying a left side border and a right side border of the selected element. Further, one or more additional elements in the freeform document aligned with the identified left side border and the right side border are identified. These elements are assembled to form the primary column. Accordingly, the primary column includes a plurality of elements consisting of the selected element and the additional elements corresponding to the selected element.

At step 130, one or more secondary columns in the freeform document corresponding to the primary column are determined. In one embodiment, the secondary columns are determined by identifying a top border or a bottom border for each of the elements in the primary column. Further, the one or more additional elements with the identified top border or the bottom border in the freeform document are identified. Furthermore, the secondary column for each of the identified additional elements is determined by identifying a left side border and a right side border of each of the identified additional elements. The determined secondary columns may include duplicates of the secondary columns as one or more additional elements may include same secondary column. Therefore, the duplicate secondary columns from the determined secondary columns are removed.

At step 140, the tabular structure in the freeform document is extrapolated based on the determined primary column as in step 120 and the one or more secondary columns as in step 130, to facilitate manipulation of elements in the freeform document. In addition, one or more spanning elements in the freeform document corresponding to the primary column and the secondary columns are determined. The spanning elements are elements that span horizontally across a plurality of columns including the primary column and the secondary columns. In one embodiment, a computer display, displaying the freeform document, is updated to include the extrapolated tabular structure. The manipulation of elements may include reordering, resizing, and deleting the elements in the freeform document, and also to include one or more new elements.

The number of processing steps varies with embodiments of the invention. In an embodiment, further processing operations can be included. In an embodiment, at step 120 after an element has been selected, a vertical search is made for a primary column. Then, in step 130, a horizontal search is made for one or more secondary columns. This search includes another vertical search. In some embodiments, a further horizontal search is made. In some embodiments, a further vertical search is made. In some embodiments, both are done. In an embodiment, in step 140, a horizontal and vertical search is made for primary and secondary columns. Extrapolating the tabular structure is illustrated with an example in FIGS. 2A to 2F, 3A to 3C, 4, and 5. Further, manipulation of elements in the freeform document is described in greater detail in FIGS. 6 to 9B.

Figure 2A:
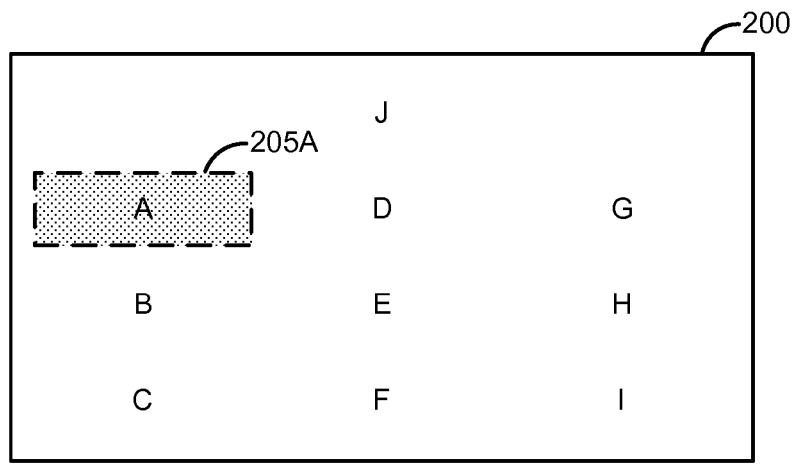
FIGS. 2A to 2F are exemplary schematic diagrams illustrating extrapolating a tabular structure in a freeform document, according to an embodiment.
Figure 2B:
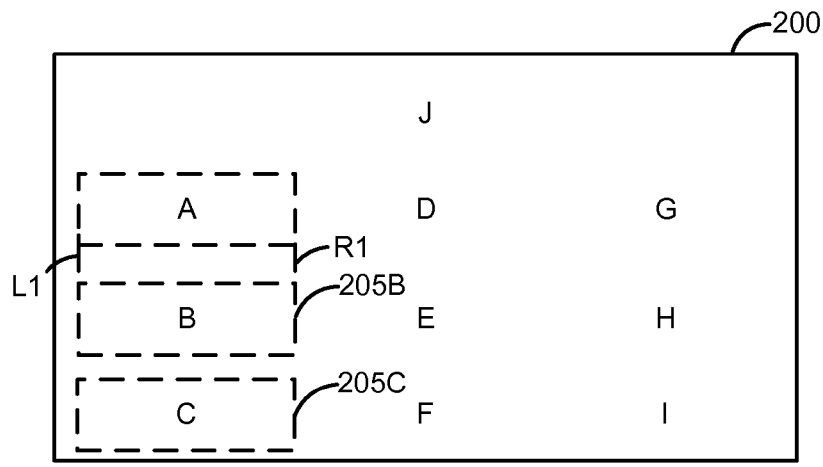
Figure 2C:
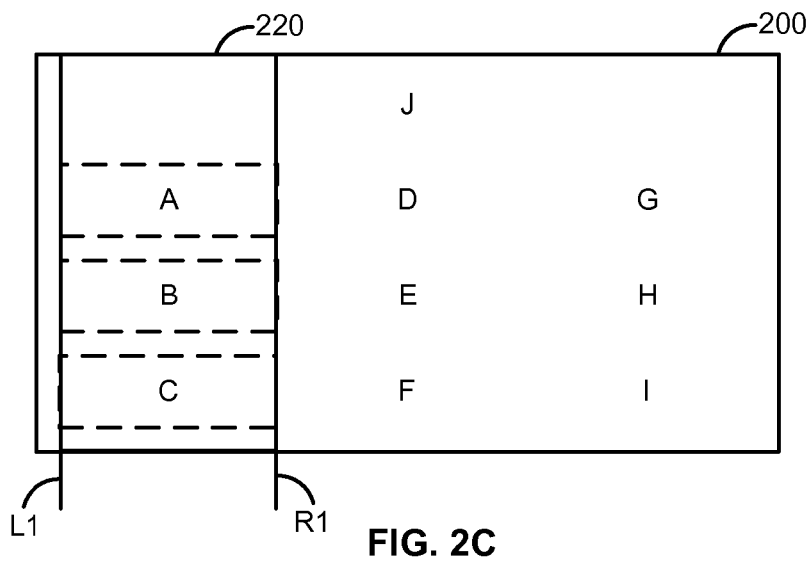

FIGS. 2A to 2F are exemplary schematic diagrams illustrating extrapolating a tabular structure 245 (e.g., in FIG. 2F) in a freeform document 200, according to an embodiment. FIG. 2A is an exemplary schematic diagram of the freeform document 200. The freeform document includes one or more elements (e.g., A to J). A tabular structure in the freeform document 200 is extrapolated based on an element selected by a user. For example, an element 205A is selected by the user in a freeform document 200. FIGS. 2B and 2C illustrate determination of a primary column 220 for the element 205A. In one embodiment, a left side border L1 and a right side border R1 of the element 205A is identified. Further, one or more additional elements (205B and 205C) with the identified left side border L1 and the right side border R1 are identified. In one embodiment, the element 205A and the identified additional elements (205B and 205C) are assembled to form the primary column 220.

Figure 2D:
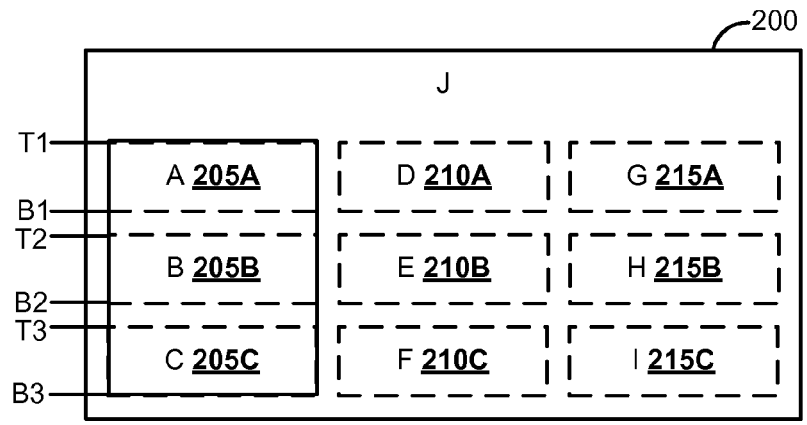
Figure 2E:
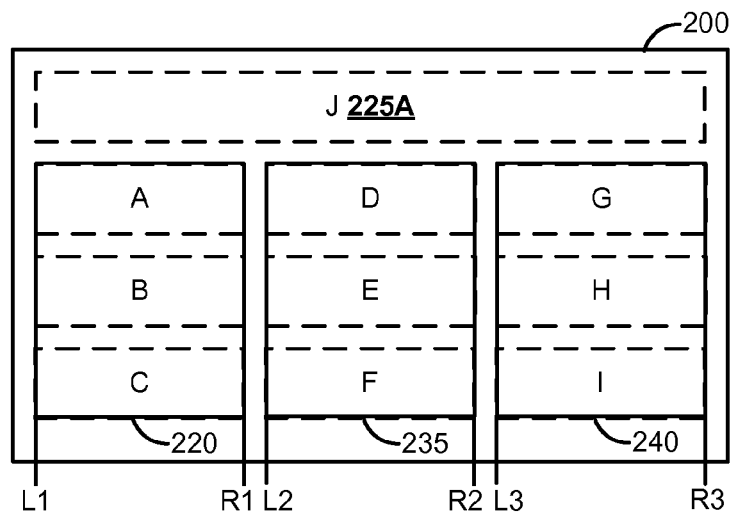

FIGS. 2D and 2E illustrate determination of one or more secondary columns 235 and 240 corresponding to the primary column 220. In one embodiment, a top border (e.g., T1, T2 and T3) and a bottom border (e.g., B1, B2 and B3) of each elements (e.g., 205A, 205B and 205C) in the primary column 220 are identified. Further, the one or more additional elements (210A to 210C and 215A to 215C) with the identified bottom border and the top border (210A and 215A having T1 and B1 like 205A; 210B and 215B having T2 and B2 like 205B; and 210C and 215C having T3 and B3 like 205C) are identified. Furthermore, one or more secondary columns for each of the identified additional elements (210A to 210C and 215A to 215C) are determined. In some embodiments, one or more duplicate columns from the determined secondary columns are removed (e.g., the determined secondary columns for elements 210A to 210C are all same, therefore, duplicate secondary columns are removed) to determine the one or more secondary columns (235 and 240) corresponding to the primary column 220. In some embodiments, any duplicate columns are not included in the determined secondary columns. The processes of excluding and removing are collectively called removing.

In one embodiment, one or more spanning elements, for example, an element J 225A, in the freeform document corresponding to the determined primary column 220 and the secondary columns (235 and 240) is identified. The spanning element J 225A spans a plurality of columns including the primary column and the secondary columns (e.g., the element J 225A corresponds to the primary column 220 and the secondary columns 235 and 240) to extrapolate tabular structure 245 in the freeform document. Similarly, the tabular structure is extrapolated corresponding to any selected elements (e.g., A 205A to J 225A) in the freeform document 200.

Figure 2F:
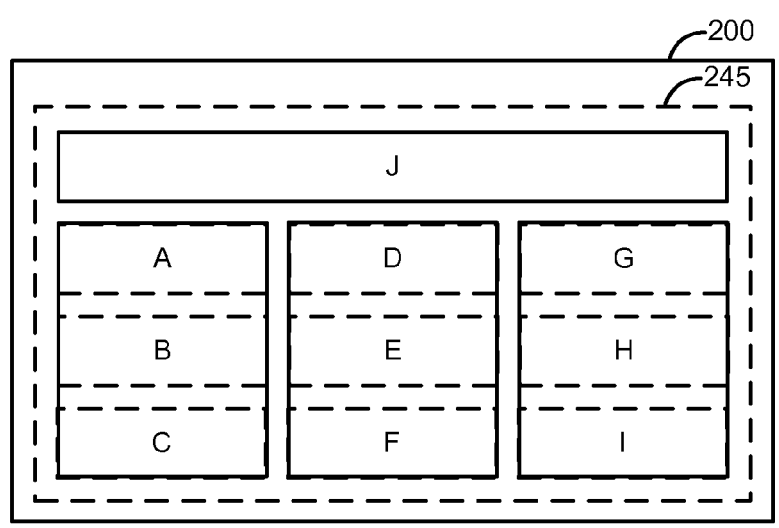

FIG. 2F shows the tabular structure 245 in the freeform document 200, according to an embodiment. In one embodiment, the tabular structure 245 in the freeform document 200 is extrapolated by assembling the determined primary column 220 and the secondary columns 235 and 240 to facilitate manipulation of elements in the freeform document. In one exemplary embodiment, the tabular structure is displayed to the users in the form of visual guidelines with specific colors. The manipulation of elements in the freeform document is described in greater detail in FIG. 3 to FIG. 6B.

Figure 3A:
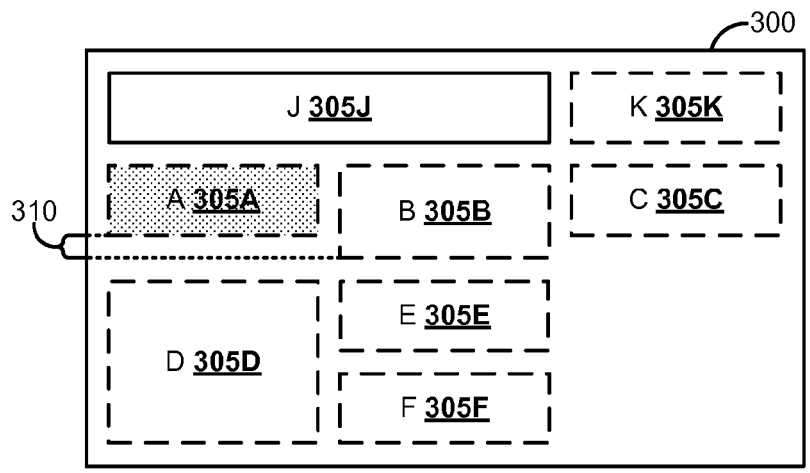
FIGS. 3A to 3C are exemplary schematic diagrams illustrating extrapolating a tabular structure in a freeform document, according to an embodiment.
Figure 3B:
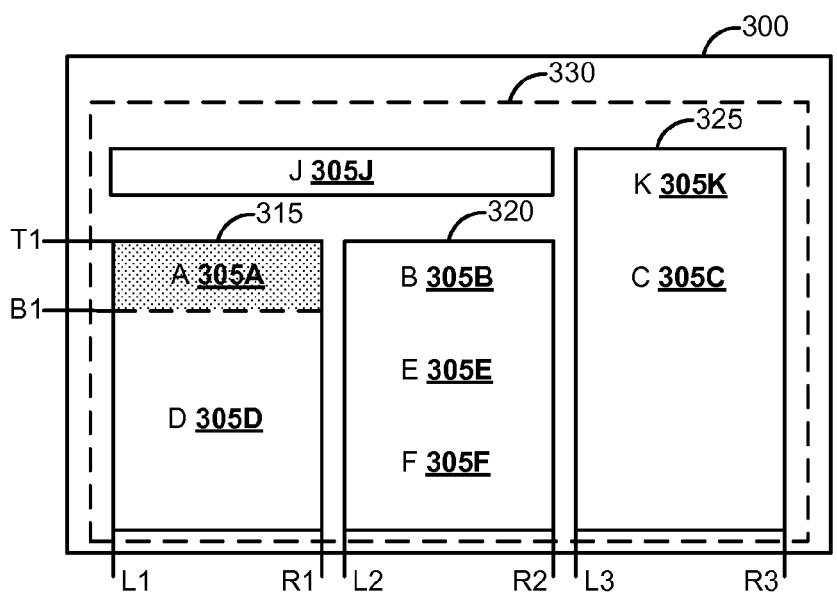
Figure 3C:
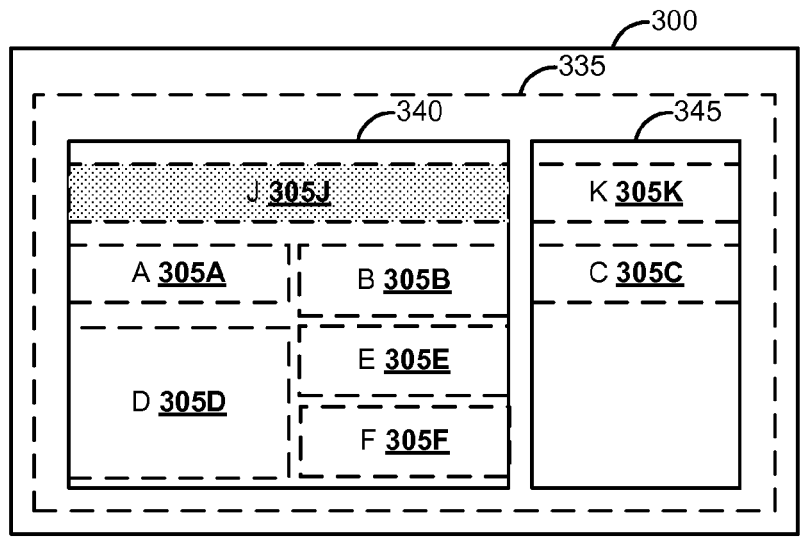

FIGS. 3A to 3C are exemplary schematic diagrams illustrating extrapolating a tabular structure in a freeform document 300, according to an embodiment. The freeform document includes one or more elements (e.g., A (305A) to K (305K)). Unlike freeform document 200 of FIG. 2A, there are few irregular height elements in the freeform document 300, for example, the element 305B has uneven bottom border 310 compared to the element 305A, and the element 305D is double the height of the element 305A. The tabular structure 330 in the freeform document 300 is extrapolated based on an element selected by a user. For example, upon selecting the element 305A, a primary column 315, two secondary columns (320 and 325), and an associated spanning element 305J are determined using the steps as described in FIG. 1 as shown in FIG. 3B.

FIG. 3B shows the extrapolated tabular structure 330 upon selecting the element 305A. The primary column 315 is headed by element 305A. The first secondary column 320 is headed by the element 305B. The element 305B is determined by the shared top border (e.g., T1) with the element 305A. In an embodiment, where the determination is done by shared bottom border (e.g., B1) there would be no match if the difference exceeded a tolerance. In an embodiment the tolerance is zero. In another embodiment, the tolerance is set to the width of an element's margin. For example, this width could be 80 twips. A twip is $1440^{th}$ of an inch. The selected element 305A is highlighted with a first highlighting. The elements of the primary column 315 are 305A and 305D. The elements of the first secondary column 320 are 305B, 305E, and 305F. And for the second secondary column 325, the elements are 305K, and 305C. The spanning element to the primary column 315 and the first secondary column 320 is element 305J. In an embodiment, the set of columns and associated spanning element are found in this order. Element 305A leads to elements 305B, and 305C by the shared top border (e.g., T1). Element 305D is found by a common side borders to 305A (e.g., L1 and R1). Elements 305E and 305F share a common side borders (e.g., L2 and R2) with the head element 305B in the column 320. Element 305K shares a common side borders (e.g., L3 and R3) with the head element 305C in the column 325. The element 305J spans the columns 315 and 320 and has common side borders (e.g., L1 and R2) with them. In an embodiment, the tabular structure 330 in the freeform document 300 is extrapolated by assembling the determined primary column 315, and the secondary columns 320 and 325, and associated spanning element 305J to facilitate manipulation of elements in the freeform document 300.

FIG. 3C shows the extrapolated tabular structure 335 upon selecting the element 305J in the freeform document 300. The extrapolated tabular structure 335 includes two columns (e.g., a primary column 340 and a secondary column 345). Below the selected element 305J is a composite element formed from the elements 305A and 305B. In an embodiment, the spanning element 305J, as the selected element, heads the primary column 340. Besides spanning element 305J, is the element 305K in secondary column 345. In one embodiment the elements 305D, 305E, and 305F are determined to be part of the column structure of column 340 in the following way. A vertical search is made from element 305J. Later, a vertical search from is made from the elements 305A and 305B, matching the left and right sides of those objects. Only one of those matches is required. In another embodiment a search is made from the composite object formed from elements 305A and 305B. In one embodiment more than one match is needed.

Figure 4:
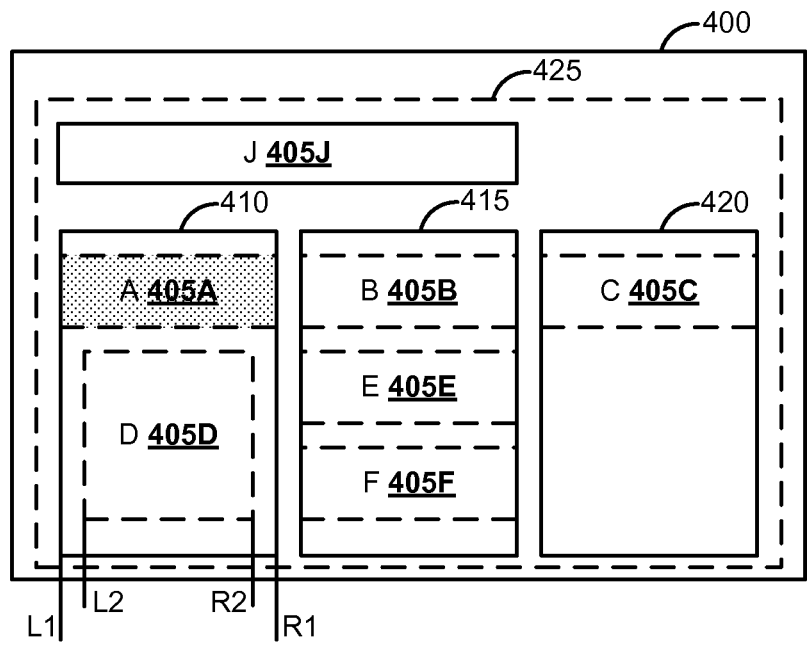
FIG. 4 is an exemplary schematic diagram illustrating extrapolating a tabular structure in a freeform document, according to an embodiment.

FIG. 4 is an exemplary schematic diagram illustrating extrapolating a tabular structure 425 in a freeform document 400, according to an embodiment. The freeform document 400 includes one or more elements (e.g., A (405A) to J (405J)). A tabular structure 425 in the freeform document 400 is extrapolated based on an element selected by a user. Unlike freeform document 200 of FIG. 2A, there is one irregular width element 405D. The width of the element 405D affects how it is associated with the extrapolated tabular structure 425. Upon selecting the element 405A, the element 405D may or may not be included in a primary column 410. If the left side border L1 and the right side border R1 exceeds the width of the element 405D by a tolerance, the element 405D is not included in the primary column 410. That is if border L2 is more than a given distance away from L1 and border R2 is more than the given distance away from R1, the element 405D is not included in the primary column 410. This is so if the search for related elements in the tabular structure ends after a few iterations. That is after an initial vertical search from the element 405A; a horizontal search is made finding the element 405B. A vertical search is made from there finding elements 405E and 405F. However, in some embodiments the search ends at this level. That is no horizontal search is made from elements 405E and 405F. In other embodiments, the search recourses further and such a horizontal search is made. Further, one or more secondary columns (e.g., column 415 (including the elements 405B, 405E and 405F) and column 420 (including the element 405C) are detected. In an embodiment, the tabular structure 425 in the freeform document 400 is extrapolated by assembling the determined primary column 410, and the secondary columns 415 and 420 to facilitate manipulation of elements in the freeform document 400.

Figure 5:
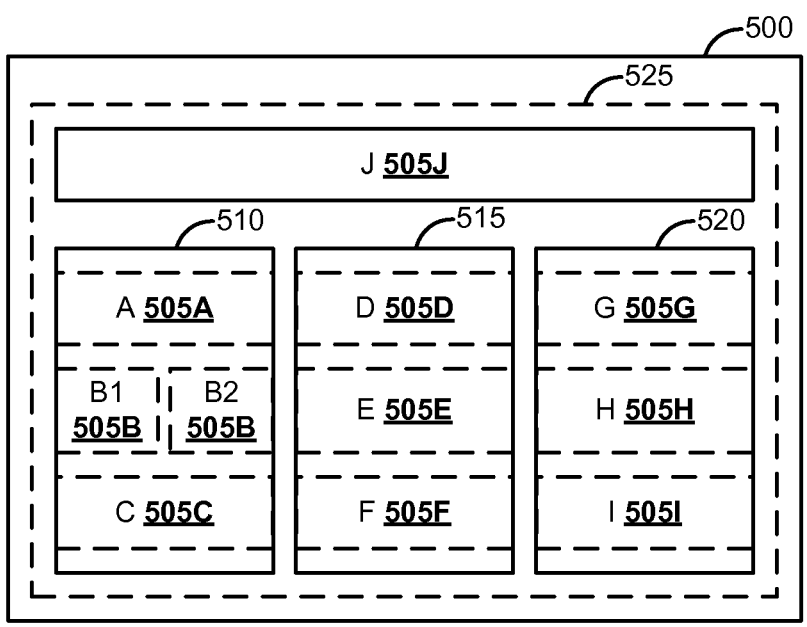
FIG. 5 is an exemplary schematic diagram illustrating extrapolating a tabular structure in a freeform document, according to an embodiment.

FIG. 5 is an exemplary schematic diagram illustrating extrapolating a tabular structure 525 in a freeform document 500, according to an embodiment. The freeform document includes one or more elements (e.g., A, B1, B2, C to J). The freeform document 500 is characterized by half width elements 505B1 and 505B2. In one embodiment, if an element 505A is selected, three columns will be determined in the extrapolated tabular structure 525. The first column 510 will include elements 505A, and 505C, with elements 505B1 and 505B2 as a composite element. This will be the primary column 510. The second column 515 will include elements 505D, 505E, and 505F. This will be a secondary column 515. The third column 520 will include elements 505G, 505H, and 505I. This will be another secondary column 520. An associated spanning element to all three columns (i.e., 510, 515 and 520) will be element 505J. In an embodiment, the tabular structure 525 in the freeform document 500 is extrapolated by assembling the determined primary column 510 and the secondary columns 515 and 520 to facilitate manipulation of elements in the freeform document 500. Further, if either element 505D or element 505G is selected substantially the same result will occur with changes in the designation primary and secondary for the columns as appropriate. If elements 505C, 505F, or 505I are selected then substantially the same result will occur, again with changes in the designation primary and secondary as appropriate.

However, in one embodiments, if element 505B1 is selected four columns will be determined in the extrapolated tabular structure. The first column will include element 505B1. This will be the primary column. The second column will include 505B1. This will be a secondary column. Associated with these will be spanning objects 505A and 505C. The third column will include elements 505D, 505E, and 505F. This will be a secondary column. The fourth column will include elements 505G, 505H, and 505I. This will be a secondary column. Associated with all four columns is a spanning element 505J. In an embodiment, if elements 505E or 505H were selected then substantially the same result will occur. Again with changes in the designation primary and secondary column status as appropriate.

Figure 6:
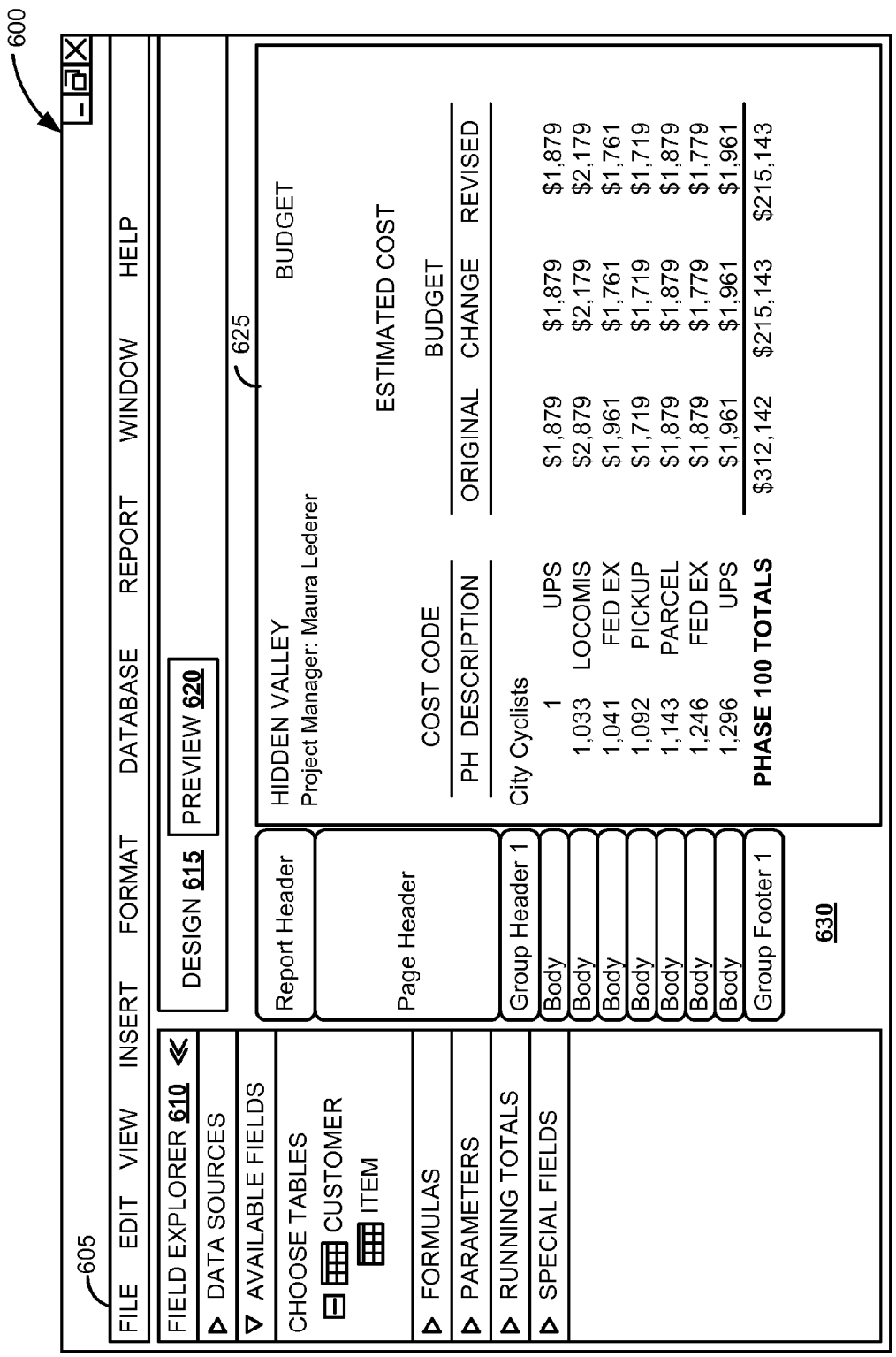
FIG. 6 illustrates an exemplary freeform document, according to an embodiment.

FIG. 6 is an exemplary freeform document 600, according to an embodiment. The freeform document 600 includes a menu bar 605, a field explorer column 610, a canvas 625, and a design option 615 and a preview option 620, elements or content on the canvas 625 of the freeform document. The elements in the canvas 625 can be segregated under titles such as a report header, a page header, a plurality of group headers and group footers and body of the freeform document 600 as in 630. Also, the canvas 625 does not include structural associations among elements.

In one embodiment, the elements in the unstructured canvas 625 can be manipulated by extrapolating a tabular structure as described in FIG. 1 based on a selected element in the freeform document 600. Manipulating the elements in the freeform document 600 can include reordering (described with an example in FIGS. 7A and 7B), resizing (described with an example in FIGS. 8A and 8B) and deleting the elements in the freeform document 600. Further, manipulating the elements in the freeform document 600 includes inserting (described with an example in FIGS. 9A and 9B) one or more new elements in the freeform document 600.

Figure 7A:
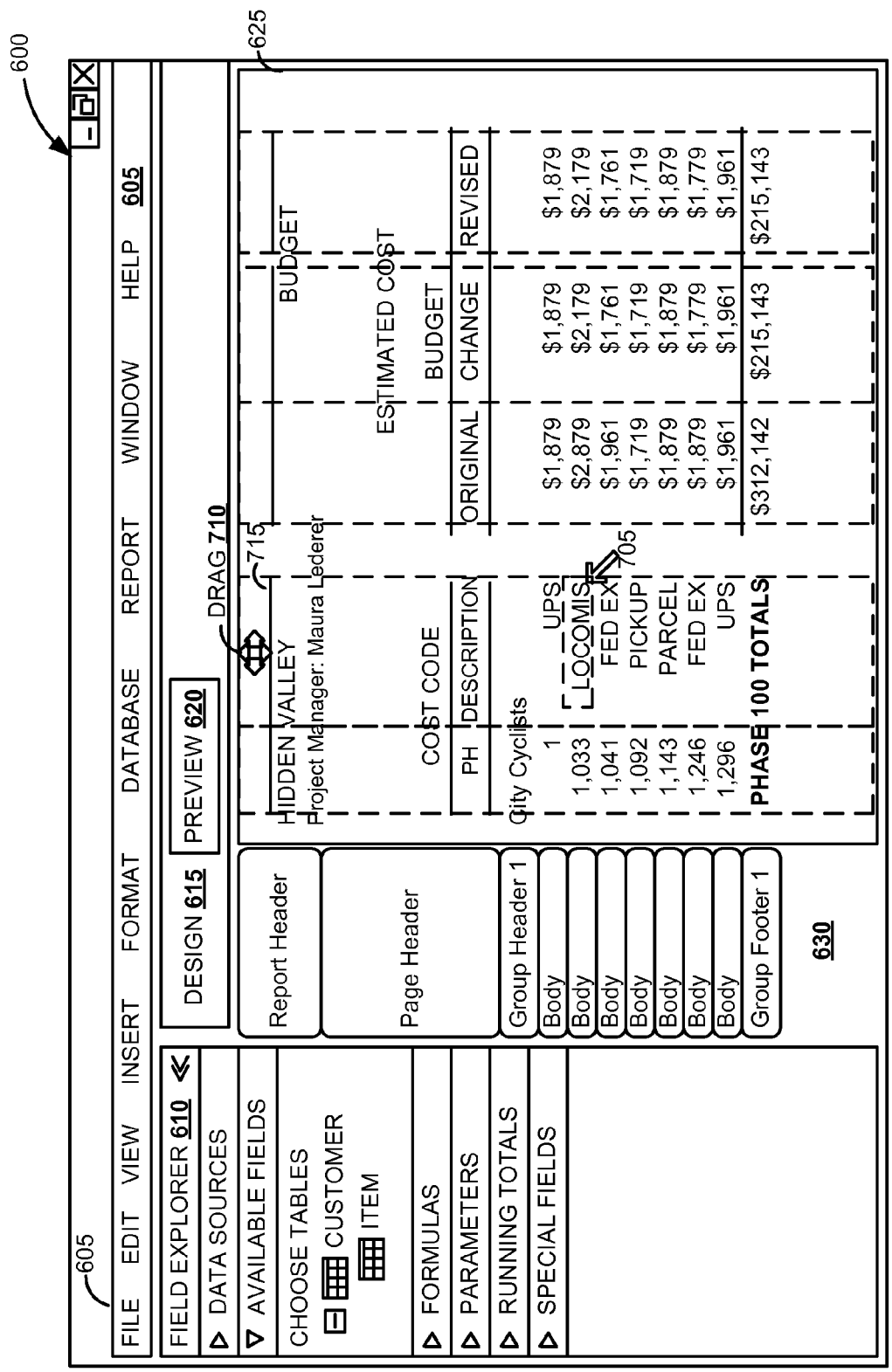
FIGS. 7A and 7B illustrate exemplary manipulation of one or more elements in the freeform document of FIG. 6 by reordering the one or more elements, according to an embodiment.
Figure 7B:
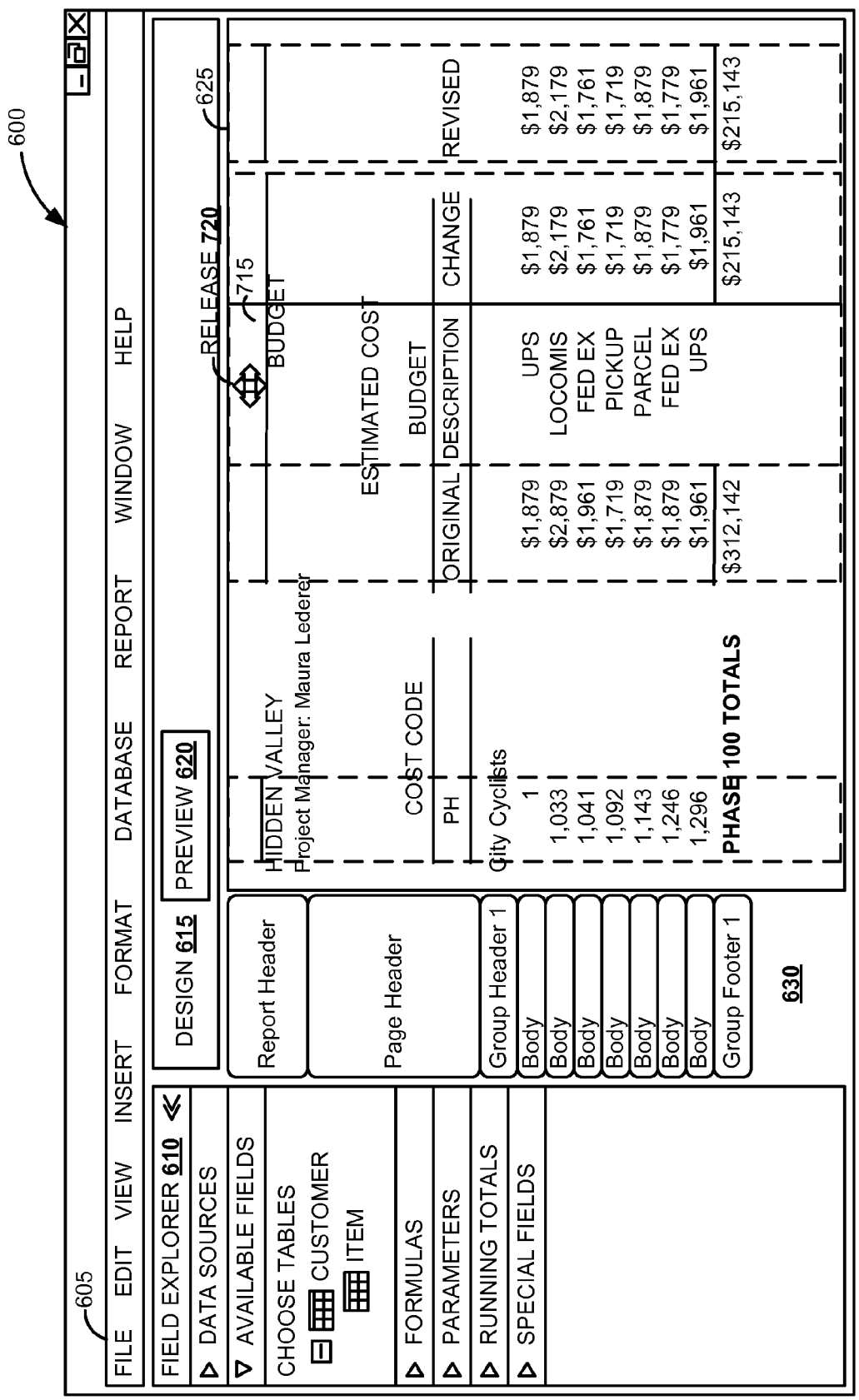

FIGS. 7A and 7B illustrate exemplary manipulation of one or more elements in the freeform document 600 of FIG. 6 by reordering the one or more elements, according to an embodiment. In one embodiment, a tabular structure is displayed to a user based on an element selected by the user. At least one element on the canvas 625 such as 'cost code' 'Locomis', '1,033', 'estimated cost' and the like can be selected by the user. For example, an element 'Locomis' 705 is selected by the user and hence, the tabular structure is displayed based on the element 'Locomis' 705 using the steps as described in FIG. 1. In one embodiment, a tabular structure including one or more spanning elements (e.g., elements such as 'cost code', 'estimated cost' 'hidden valley' and the like) will be extrapolated, however guidelines of the tabular structure including the selected element 'Locomis' 705 is given priority and the same will be displayed.

In one exemplary embodiment, the user can select and drag a desired column (e.g., a column 715), as shown by annotation 'drag' 710 in FIG. 7A. Further, the user can release the desired column 715, as shown by annotation 'release' 720 at a desired location on the freeform document 600 as shown in FIG. 7B. Therefore, the user is provided with the option of manipulating the elements in the freeform document 600 by reordering the elements in the freeform document 600.

Figure 8A:
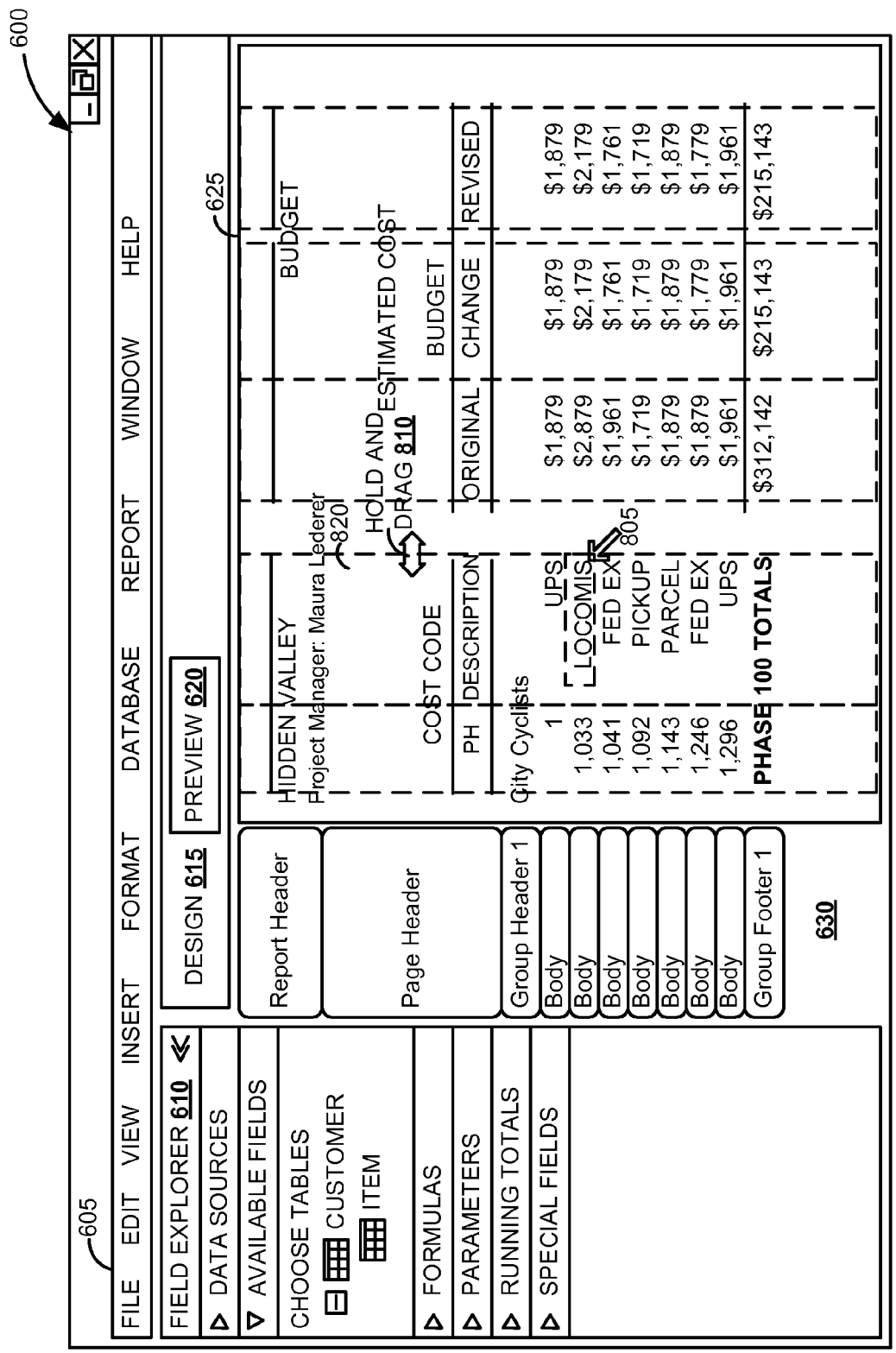
FIGS. 8A and 8B illustrate exemplary manipulation of one or more elements in the freeform document of FIG. 6 by resizing the one or more elements, according to an embodiment.
Figure 8B:
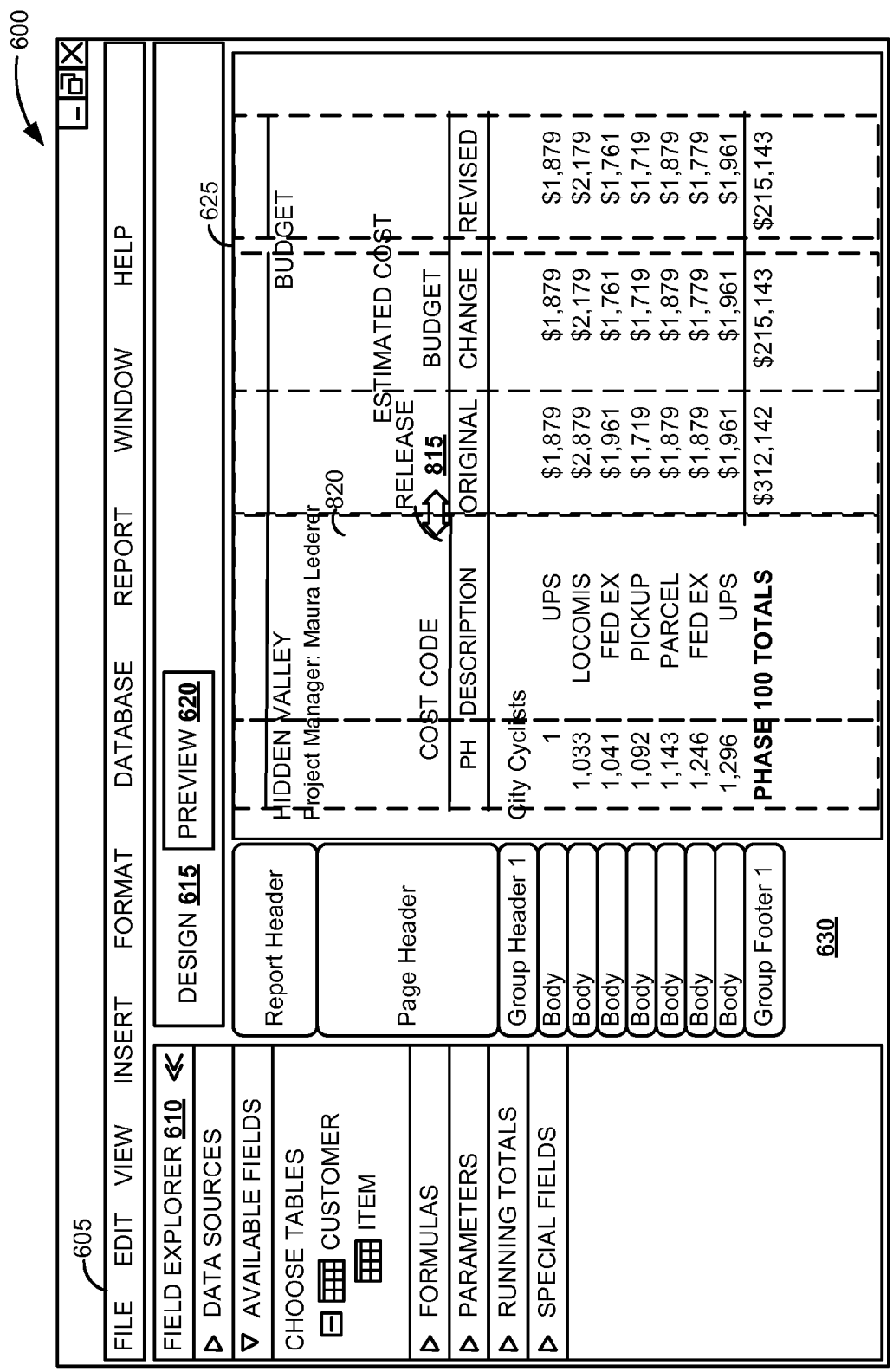

FIGS. 8A and 8B illustrate exemplary manipulation of one or more elements in the freeform document 600 of FIG. 6 by resizing the one or more elements, according to an embodiment. In one embodiment, a tabular structure is displayed to a user based on an element as selected by the user. For example, an element 'Locomis' 805 is selected by the user and hence, the tabular structure is displayed based on the element 'Locomis' 805 using the steps as described in FIG. 1.

In one exemplary embodiment, the user can drag the edge of a desired column (e.g., a column 820), as shown by annotation 'hold and drag' 810 to resize the column 820 as shown in FIG. 8A. Further, the user can release at a desired location, as shown by annotation 'release' 815 on the freeform document 600 as shown in FIG. 8B without disturbing the other elements in the freeform document 600 that are not part of the extrapolated tabular structure. Therefore, the user is provided with the option of manipulating the elements in the freeform document 600 by resizing the elements. Similarly, in one exemplary embodiment, the desired column can be deleted without disturbing other elements in the freeform document that are not part of the extrapolated tabular structure.

Figure 9A:
FIGS. 9A and 9B illustrate exemplary manipulation of the freeform document of FIG. 6 by inserting one or more new elements, according to an embodiment.
Figure 9B:
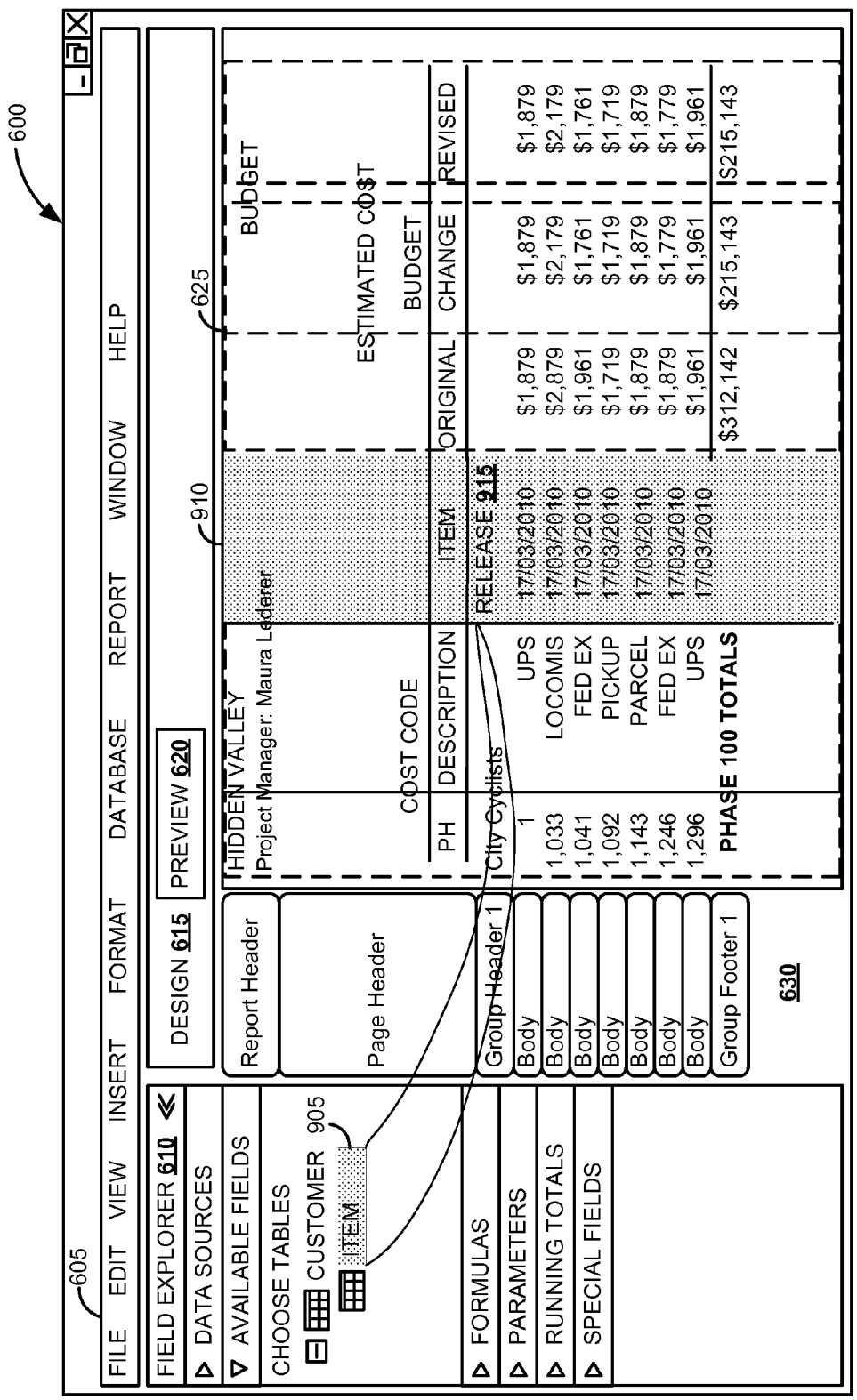
Figure 10:
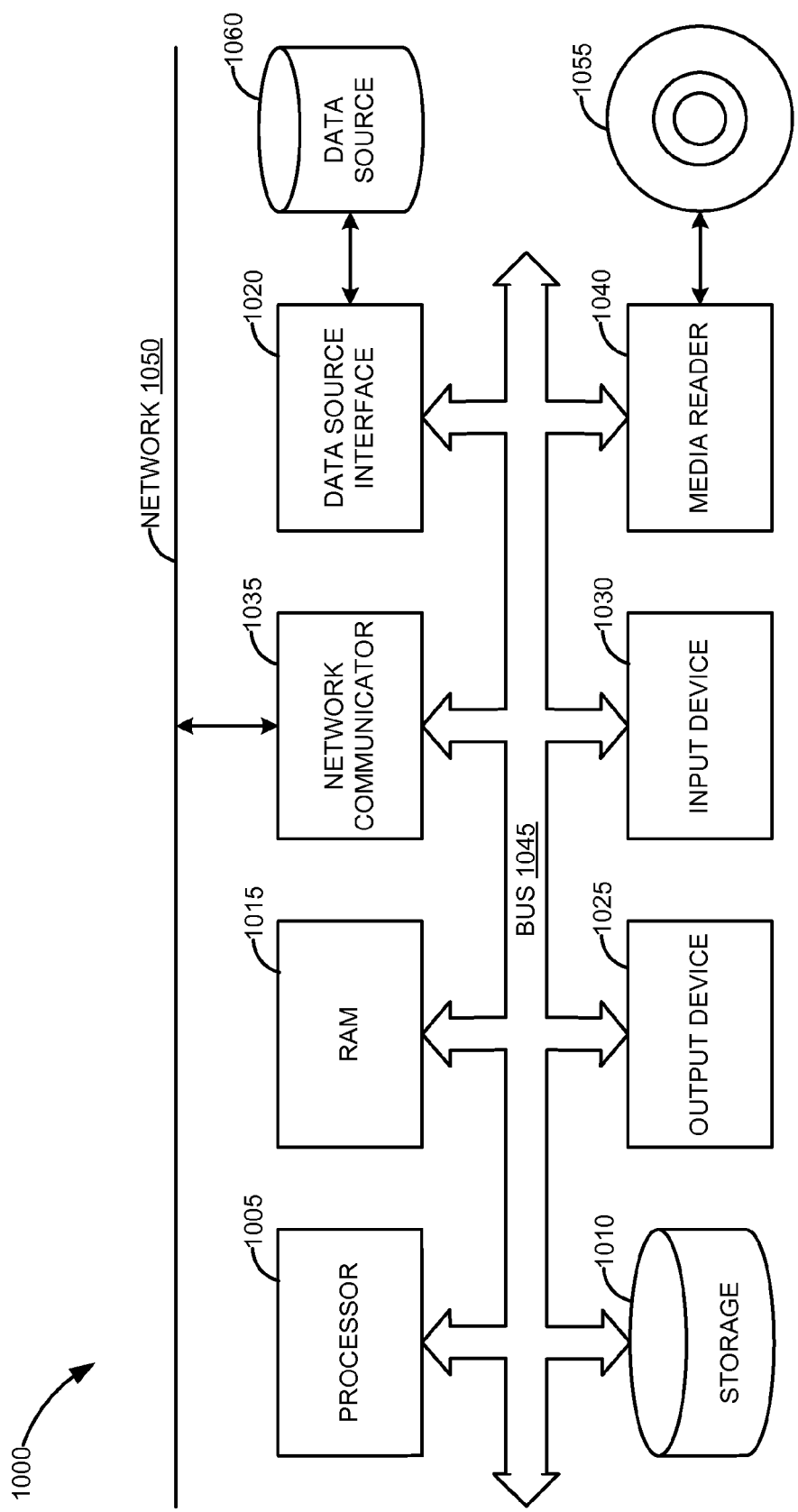
FIG. 10 is a block diagram illustrating a computing environment in which the techniques described for extrapolating a tabular structure in a freeform document, according to an embodiment.

FIGS. 9A and 9B illustrate exemplary manipulation of the freeform document 600 of FIG. 6 by inserting one or more new elements 905 that are part of the application but not in the freeform document 600, according to an embodiment. In one embodiment, new table content, for example, 'item' 905, can be inserted to the freeform document 600. In one embodiment, the content (i.e., column 910 relating to 'item'905) is added by selecting 'item' 905, dragging the 'item'905 over and releasing the 'item' 905 at a desired location, as shown by annotations 'drag' 910 and 'release' 615 in the freeform document 600. In one exemplary embodiment, when no element in the freeform document 600 is selected, a tabular structure that is displayed to a user will be based on the element 'item' 905 that is being dragged 910 over and released 915, using same steps as described in FIG. 1. Further, as the cursor approaches the guideline of tabular structure, visual feedback will be displayed to the user indicating that the guideline will be altered and a new column 910 is created as shown in FIG. 9B.

In another exemplary embodiment, when an element on the canvas 625 is selected, the guideline system that is displayed to the user will be based on the element that is already selected. As the user drags over the canvas, the width of the element resizes dynamically to match the column currently being hovered over.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

FIG. 1000 is a block diagram of an exemplary computer system 1000. The computer system 1000 includes a processor 1005 that executes software instructions or code stored on a computer readable storage medium 1055 to perform the above-illustrated methods of the invention. The computer system 1000 includes a media reader 1040 to read the instructions from the computer readable storage medium 1055 and store the instructions in storage 1010 or in random access memory (RAM) 1015. The storage 1010 provides a large space for keeping static data where at least some instructions could be stored for later execution. The stored instructions may be further compiled to generate other representations of the instructions and dynamically stored in the RAM 1015. The processor 1005 reads instructions from the RAM 1015 and performs actions as instructed. According to one embodiment of the invention, the computer system 1000 further includes an output device 1025 (e.g., a display) to provide at least some of the results of the execution as output including, but not limited to, visual information to users and an input device 1030 to provide a user or another device with means for entering data and/or otherwise interact with the computer system 1000. Each of these output devices 1025 and input devices 1030 could be joined by one or more additional peripherals to further expand the capabilities of the computer system 1000. A network communicator 1035 may be provided to connect the computer system 1000 to a network 1050 and in turn to other devices connected to the network 1050 including other clients, servers, data stores, and interfaces, for instance. The modules of the computer system 1000 are interconnected via a bus 1045. Computer system 1000 includes a data source interface 1020 to access data source 1060. The data source 1060 can be accessed via one or more abstraction layers implemented in hardware or software. For example, the data source 1060 may be accessed by network 1050. In some embodiments the data source 1060 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture including a non-transitory computer readable storage medium to store instructions, which when executed by a computer, cause the computer to:
receive a selection of at least one element in a freeform document;
determine a primary column for the selected at least one element, wherein the primary column comprises:
the at least one element; and
one or more additional elements identified based on a left side border of the at least one element, a right side border of the at least one element and whether the left side border and the right side border exceeds width of the one or more additional elements by a tolerance;
determine one or more secondary columns corresponding to the determined primary column based on a top border or a bottom border corresponding to elements in the primary column, and a tolerance corresponding to the top border or the bottom border;
extrapolate a tabular structure in the freeform document based on the determined primary column and the one or more secondary columns to facilitate manipulation of one or more elements in the freeform, wherein manipulating one or more elements in the freeform document comprises dragging and releasing one or more columns in a desired location within the freeform document; and
update a computer display including the freeform document to include the tabular structure.

2. The article of manufacture of claim 1, wherein the freeform document is an unstructured document providing ability to place the one or more elements.

3. The article of manufacture of claim 1, wherein determining the one or more secondary columns corresponding to the primary column comprises:
identifying one or more additional elements in the freeform document based on the top border or the bottom border corresponding to elements in the primary column, and the tolerance corresponding to the top border or the bottom border;
determining one or more secondary columns for each of the identified one or more additional elements; and
removing one or more duplicate columns from the determined one or more secondary columns to determine the one or more secondary columns corresponding to the primary column.

4. The article of manufacture of claim 1, wherein the non-transitory computer readable storage medium tangibly stores further instructions, which when executed by the computer cause the computer to identify one or more spanning elements in the freeform document from the determined primary column and the one or more secondary columns, wherein the one or more spanning elements span horizontally across one or more columns consisting the primary column and the one or more secondary columns, to extrapolate tabular structure in the freeform document.

5. The article of manufacture of claim 1, wherein manipulating the elements in the freeform document further comprises reordering, resizing and deleting the one or more elements in the freeform document.

6. The article of manufacture of claim 5, wherein manipulating the elements in the freeform document further comprises inserting one or more new elements in the freeform document.

7. A computerized method for extrapolating a tabular structure in a freeform document, the method comprising:
receiving selection of at least one element in a freeform document;
determining a primary column for the selected at least one element, wherein the primary column comprises:
the at least one element; and
one or more additional elements identified based on a left side border of the at least one element, a right side border of the at least one element, and whether the left side border and the right side border exceeds width of the one or more additional elements by a tolerance;
determining one or more secondary columns corresponding to the determined primary column based on a top border or a bottom border corresponding to elements in the primary column, and a tolerance corresponding to the top border or the bottom border;
extrapolating a tabular structure in the freeform document based on the determined primary column and the one or more secondary columns to facilitate manipulation of one or more elements in the freeform document, wherein manipulating one or more elements in the freeform document comprises dragging and releasing one or more columns in a desired location within the freeform document; and
updating a computer display including the freeform document to include the tabular structure.

8. The computerized method of claim 7, wherein the freeform document is an unstructured document providing ability to place the one or more elements.

9. The computerized method of claim 7, wherein determining the one or more secondary columns corresponding to the primary column comprises:
identifying one or more additional elements in the freeform document based on the top border or the bottom border corresponding to elements in the primary column, and the tolerance corresponding to the top border or the bottom border;
determining one or more secondary columns for each of the identified one or more additional elements; and
removing one or more duplicate columns from the determined one or more secondary columns to determine the one or more secondary columns corresponding to the primary column.

10. The computerized method of claim 7, further comprising:
identifying one or more spanning elements in the freeform document from the determined primary column and the one or more secondary columns, wherein the one or more spanning elements span horizontally across a plurality of columns consisting the primary column and the one or more secondary columns, to extrapolate tabular structure in the freeform document.

11. The computerized method of claim 7, wherein manipulating the elements in the freeform document further comprises reordering, resizing and deleting the one or more elements in the freeform document.

12. The computerized method of claim 11, wherein manipulating the elements in the freeform document further comprises inserting one or more new elements in the freeform document.

13. A computer system for extrapolating a tabular structure in a freeform document, the computer system comprising:

at least one processor; and one or more memory devices communicative with the at least one processor, wherein the one or more memory devices store instructions to:

receive a selection of at least one element in a freeform document;

determine a primary column for the selected at least one element, wherein the primary column comprises:

the at least one element; and one or more additional elements identified based on a left side border of the at least one element, a right side border of the at least one element, and whether the left side border and the right side border exceeds width of the one or more additional elements by a tolerance;

determine one or more secondary columns corresponding to the determined primary column based on a top border or a bottom border corresponding to elements in the primary column, and a tolerance corresponding to the top border or the bottom border;

extrapolate a tabular structure in the freeform document based on the determined primary column and the one or more secondary columns to facilitate manipulation of one or more elements, wherein manipulating one or more elements in the freeform document comprises dragging and releasing one or more columns in a desired location within the freeform document; and update a computer display including the freeform document to include the extrapolated tabular structure.

14. The computer system of claim 13, wherein the freeform document is an unstructured document providing ability to place the one or more elements.

15. The computer system of claim 13, wherein determining the one or more secondary columns corresponding to the primary column comprises:

identifying one or more additional elements in the freeform document based on the top border or the bottom border corresponding to elements in the primary column, and the tolerance corresponding to the top border or the bottom border;

determining one or more secondary columns for each of the identified one or more additional elements; and removing one or more duplicate columns from the determined one or more secondary columns to determine the one or more secondary columns corresponding to the primary column.

16. The computer system of claim 13, further comprising instructions, which when executed by the computer cause the computer to identify one or more spanning elements in the freeform document from the determined primary column and the one or more secondary columns, wherein the one or more spanning elements span horizontally across one or more columns consisting the primary column and the one or more secondary columns, to extrapolate tabular structure in the freeform document.

17. The computer system of claim 13, wherein manipulating the elements in the freeform document further comprises reordering, resizing and deleting the one or more elements in the freeform document, and inserting one or more new elements in the freeform document.

* * * * *